(12) United States Patent
Prakash

(10) Patent No.: US 7,774,843 B1
(45) Date of Patent: Aug. 10, 2010

(54) SYSTEM, METHOD AND COMPUTER PROGRAM PRODUCT FOR PREVENTING THE EXECUTION OF UNWANTED CODE

(75) Inventor: Ranjan Prakash, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 1302 days.

(21) Appl. No.: 11/281,966

(22) Filed: Nov. 16, 2005

(51) Int. Cl.
*G06F 11/00* (2006.01)
*G06F 17/30* (2006.01)
(52) U.S. Cl. .......................................... 726/22; 726/26
(58) Field of Classification Search ............. 726/22–26; 713/187–188; 717/100, 140–141
See application file for complete search history.

(56) References Cited

U.S. PATENT DOCUMENTS

| 6,684,394 B1 * | 1/2004 | Shann ......................... 717/162 |
| 6,772,292 B2 | 8/2004 | Garber et al. ................ 711/132 |
| 7,080,366 B2 * | 7/2006 | Kramskoy et al. .......... 717/148 |
| 2002/0112227 A1 | 8/2002 | Kramskoy et al. .......... 717/148 |

* cited by examiner

*Primary Examiner*—Hosuk Song
(74) *Attorney, Agent, or Firm*—Zilka-Kotab, PC

(57) ABSTRACT

A system, method and computer program product are provided for preventing the execution of unwanted code. An indicator is initially received which is representative of an amount of data to be read from a stack. An amount of data is then read from the stack based on the indicator, such that execution of unwanted code is avoided.

14 Claims, 4 Drawing Sheets

SYSTEM, METHOD AND COMPUTER PROGRAM PRODUCT FOR PREVENTING THE EXECUTION OF UNWANTED CODE

FIELD OF THE INVENTION

The present invention relates to unwanted code, and more particularly to preventing the execution of unwanted code.

BACKGROUND

With the advent of general access computer networks, such as the Internet, people may now easily exchange application data between computer systems. Unfortunately, some people have taken advantage of such easy data exchange by developing various threats, such as malware. One particular type of computing framework that is vulnerable to such malicious acts include run-time libraries and associated routines. Such run-time libraries typically include a program or library of basic code that is used by a particular computer language to manage a program written in such language while it is running.

For example, the C/C++ run-time library provides routines like printf, scanf, etc. which accept a variable number of arguments. When one of these routines is called by a client application, data to be used in association with the routine is pushed onto a stack sequentially, one-by-one, by the client application. Thereafter, control is transferred to the specific C/C++ run-time routine.

When such control is transferred to the run-time routine, the routine reads as much data as is requested to be read from the stack. This happens with no way of knowing how many bytes of data were actually pushed on to the stack by the client application. This means that a hacker may craft the input appropriately such that these routines may be manipulated to access more data than the client application actually requested the routine to read.

Unfortunately, such additional data may be malicious in nature. While there are systems that identify any code and, particularly, malicious code, on the stack to prevent the execution thereof; the instant vulnerability still remains, since this technique requires that such code be identifiable (e.g. utilizing signatures or other identification techniques, etc.).

One specific example will now be set forth illustrating an exploitation of such vulnerability that persists in the prior art. Specifically, in the context of the routine printf( ), a format string is typically accepted which identifies a number of parameters. Unfortunately, compilers are unable to check if the number of parameters mentioned in the format string is less or more than the actual parameters specified.

To this end, a hacker may use this weakness to craft a format string to tell printf( ) to read more parameters than are actually supplied. This, in turn, may result in the printf( ) routine reading more data from the stack than was actually supplied. Thus, using this vulnerability, such hacker may use the printf( ) routine to dump the return address location of the stack. Further, by knowing where such return address location is stored, the hacker may change the return address to execute unwanted code.

There is thus a need for overcoming these and/or other problems associated with the prior art.

SUMMARY

A system, method and computer program product are provided for preventing the execution of unwanted code. An indicator is initially received which is representative of an amount of data to be read from a stack. An amount of data is then read from the stack based on the indicator, such that execution of unwanted code is avoided.

DETAILED DESCRIPTION

Figure 1:
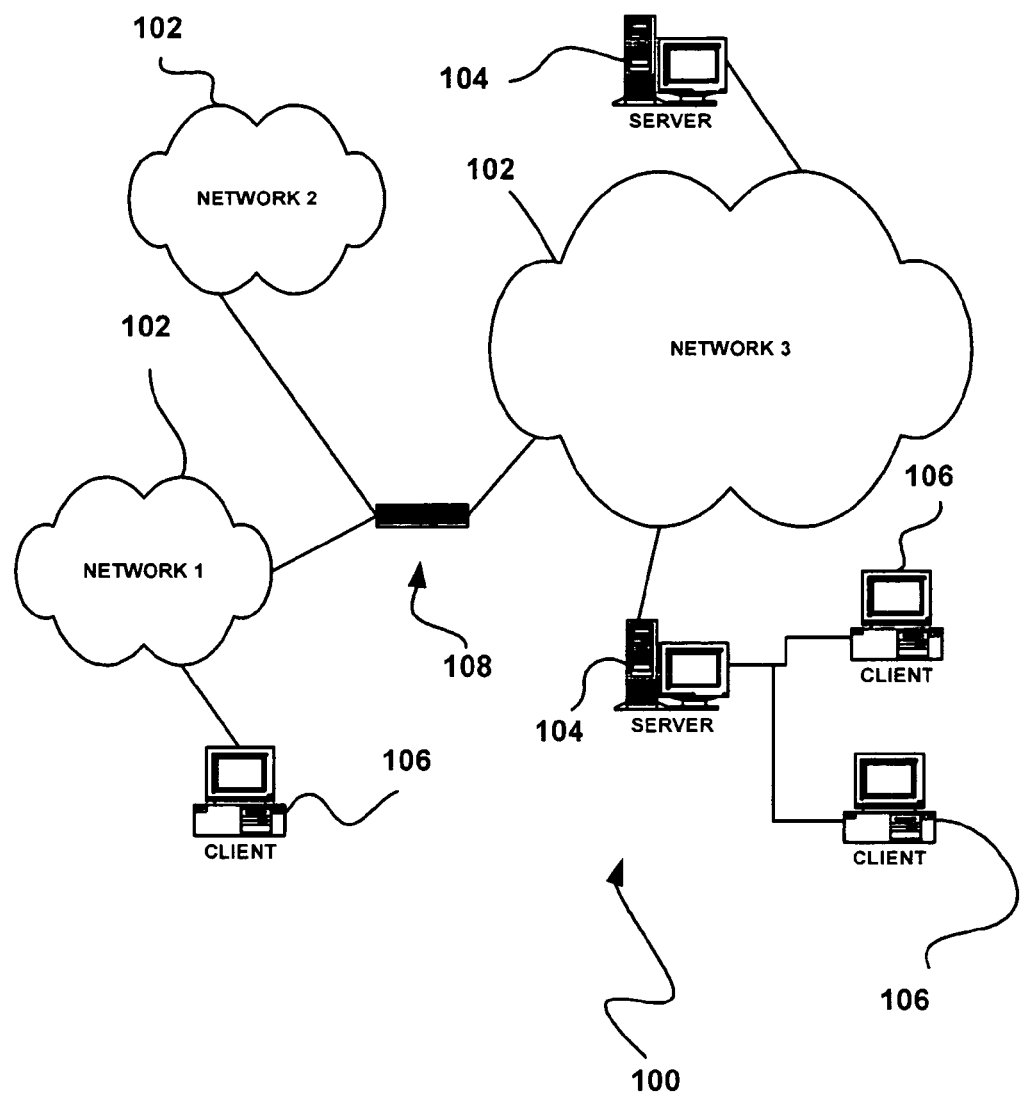
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

It should be noted that any of the foregoing network devices in the present network architecture 100, as well as any other unillustrated hardware and/or software, may be equipped with a system, method and computer program product for preventing the execution of unwanted code in association with a stack of data, where such data includes any computer readable entity that is accessible by a routine (i.e. process, program, sequence of instructions, function, etc.).

In the context of the present description, the term stack may refer to any data structure that works on the principle of last-in first-out (LIFO), such that a last piece of data put on the stack is the first piece of data that is taken off, etc. Still yet, the term unwanted code may refer to any computer readable entity including spyware, malware (e.g. viruses, Trojans, worms, etc.), intrusions, spam electronic mail, and/or any other computer readable entity that is considered undesirable.

In order to prevent the execution of unwanted code, an indicator is initially received which is representative of an amount of data to be read from the stack. Such indicator may take on any data structure, form, etc. that is capable of representing of an amount of data. Thus, in use, an amount of data may be then read from the stack based on the indicator, such that execution of unwanted code is avoided.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
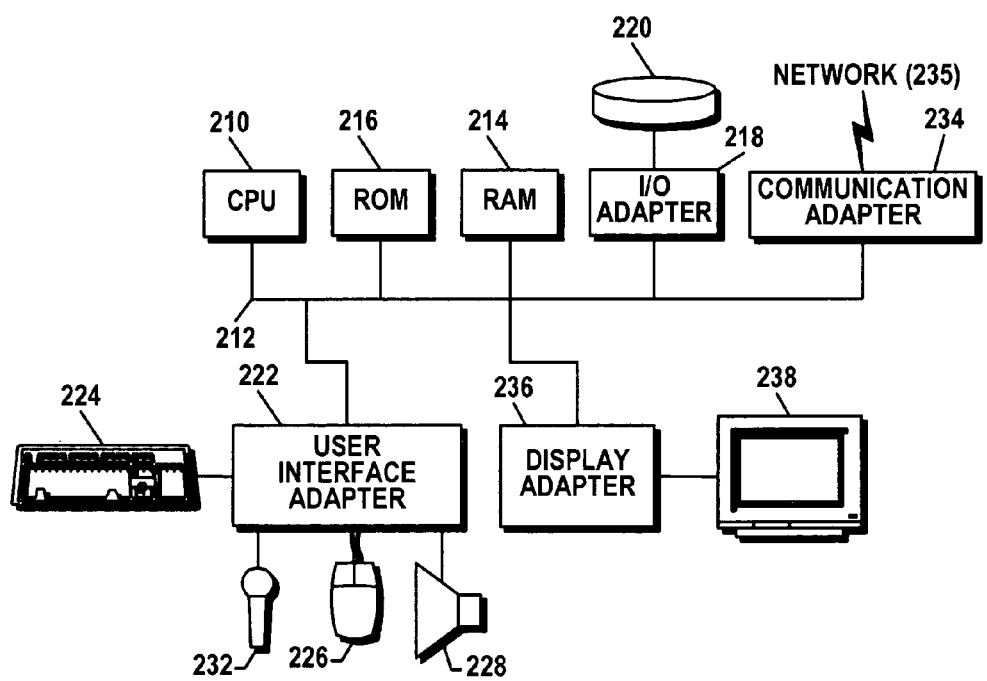
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
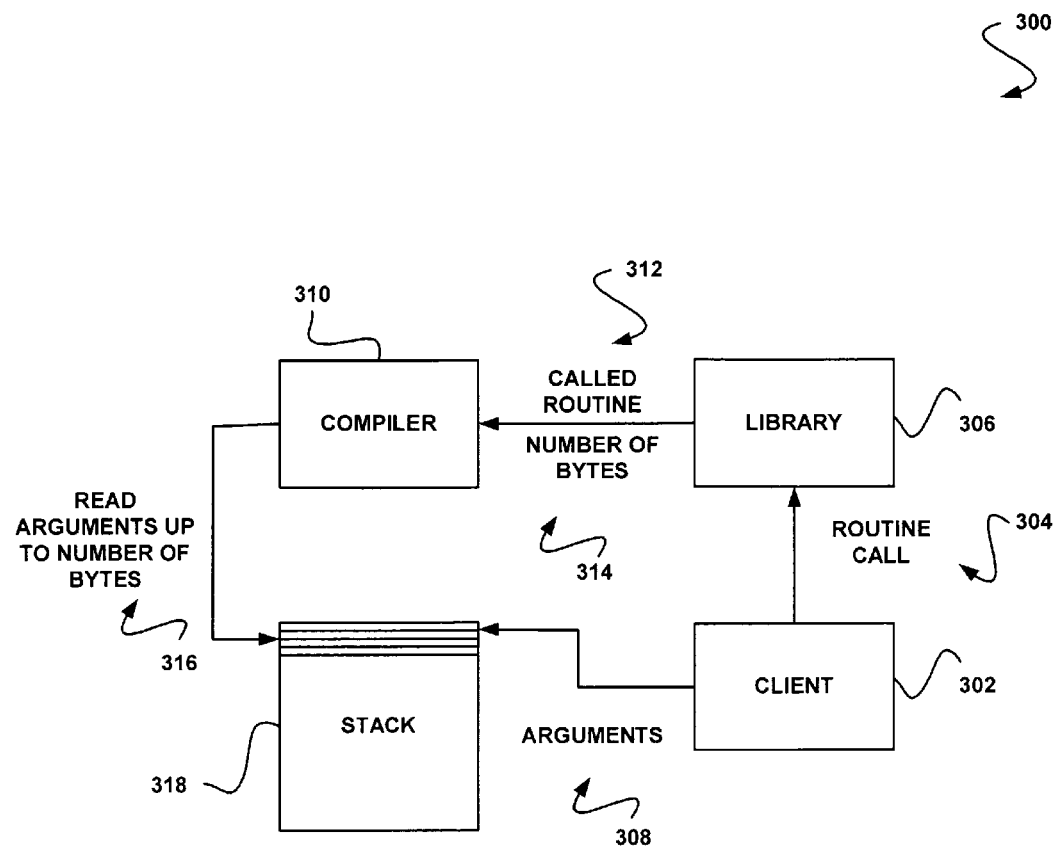
FIG. 3 shows an architecture for preventing the execution of unwanted code, in accordance with one embodiment.

FIG. 3 shows an architecture 300 for preventing the execution of unwanted code, in accordance with one embodiment. As an option, the present architecture 300 may be implemented in the context of the framework and environment of FIGS. 1 and/or 2. Of course, however, the architecture 300 may be carried out in any desired environment.

As shown, a client application 302 is included which may take the form of any application program capable of calling routines in association with a library 306 and associated compiler 310. In one embodiment, the library 306 may include a C/C++ run-time library which may include a program or library of basic code that may be used by a the C/C++ programming language to manage a program written in such language while it is running. Of course, however, it should be noted that the term library may refer to a program or library of basic code associated with any type of programming language, and may further refer to non-run-time environments, in some embodiments (e.g. compile-time, etc.).

To facilitate the execution of the aforementioned called routines, the client application 302 pushes data onto a stack 318, which is accessible by the compiler 310. In use, the data is pushed onto the stack 318 in conjunction with a routine call 304 that is provided to the library 306. Further, such data, in one embodiment, may include arguments 308 capable of being used by the called routine.

In turn, the library 306 provides to the compiler 310 the called routine 312 as well as an indicator which is representative of an amount of data to be read from the stack 318. For example, in one embodiment, the indicator may be representative of a number of bytes of data 314 to be read from the stack 318. Thus, in use, an amount of data may be then read from the stack 318 based on the indicator (see 316). It should be noted that such indicator may be provided with or without altering the various components of the architecture 300.

For example, in one embodiment, unillustrated code may be injected into and/or used to wrap the various routines available in the library 306, such that the routine itself is capable of controlling its operation to ensure that an amount of data is read from the stack 318 based on a predetermined amount.

Further, in another embodiment, the compiler 310 may be tailored to read an indicated number of bytes of data that has been pushed onto the stack 318 for the routine. Still yet, the run-time library 306 may be altered to treat the first parameter received in association with a routine called by the client application 302 as the indicator, instead of a typical first parameter. Again, with this information, the routine is capable of stopping the reading data from the stack 318, after it has read the indicated number of bytes.

One possible drawback associated with the instant embodiment is that client code may have to be recompiled along with the library 306. To mitigate such drawback during any transition periods when some applications have been re-compiled (but others have not), the instant functionality may be tailored for only vulnerable routines (e.g. those that accept a pointer to a string as the first parameter such as printf and scanf routines, etc.).

Specifically, in such embodiment, the indicator may be conditionally received and used based on whether the routine is indeed vulnerable. Of course, this can be accomplished in any desired manner. For example, a list of vulnerable routines may be maintained, generic routine-independent vulnerability characteristics may be used to identify vulnerable routines, and/or any other technique may be used to conditionally employ the indicator only in situations where it is needed to prevent the execution of unwanted code.

Still yet, in the present embodiment, the library 306 may be tailored to check if the first parameter associated with a routine call is potentially a valid pointer (e.g. stack, heap, global, etc). If it is not, the library 306 may assume that such parameter is the indicator (e.g. a number of bytes pushed onto the stack 318 for the routine to read, etc.). It should be noted that, since address values associated with valid pointers are much larger than usual parameters, it is unlikely for the routine to be unable to distinguish between a pointer address and an indicator of a number of bytes.

Figure 4:
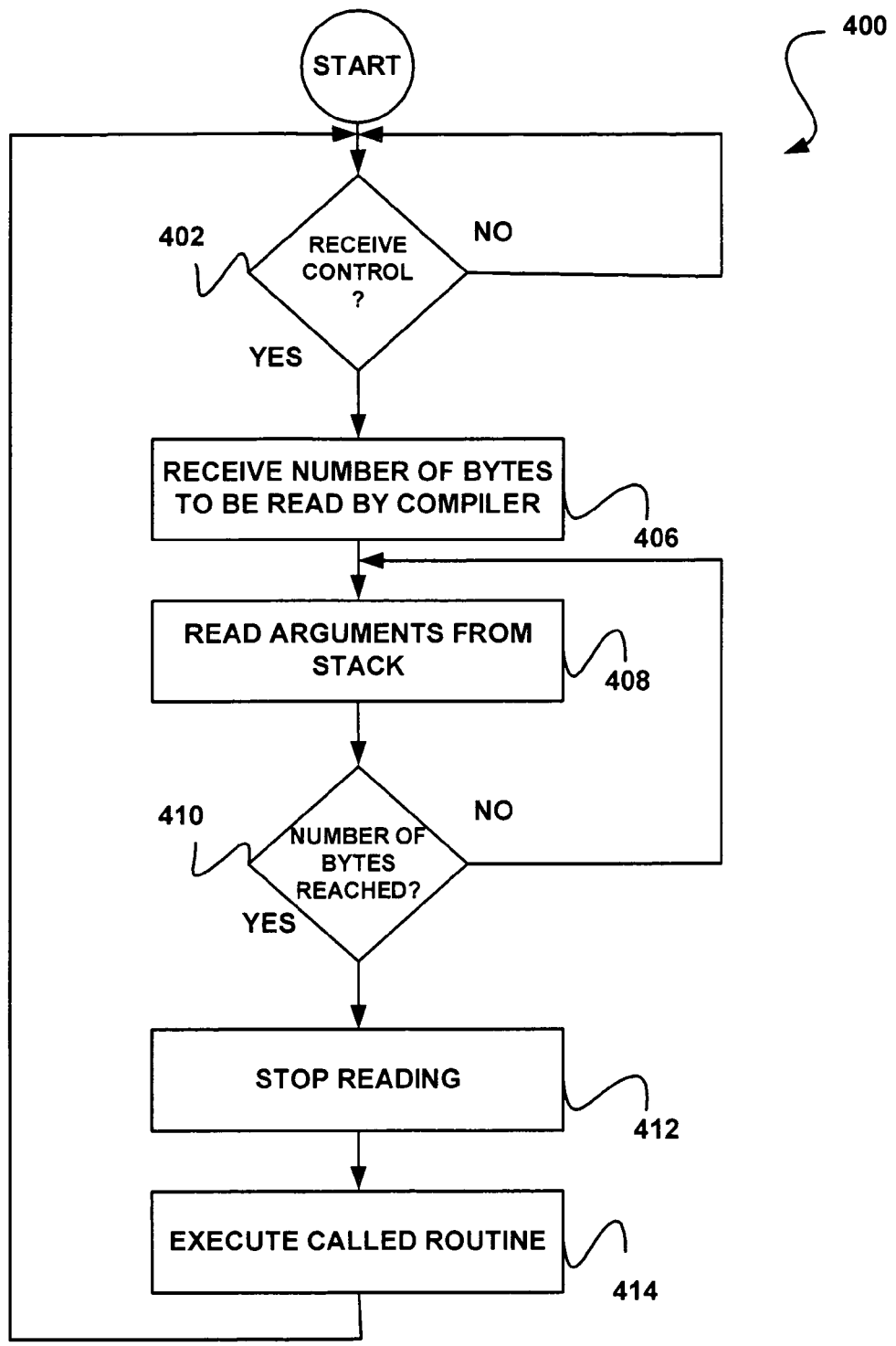
FIG. 4 shows a method for preventing the execution of unwanted code, in accordance with one embodiment.

FIG. 4 shows a method 400 for preventing the execution of unwanted code, in accordance with one embodiment. As an option, the present method 400 may be implemented in the context of the architecture and environment of FIGS. 1 and/or 2 and, specifically, in the context of the compiler 310 of FIG. 3. Of course, however, the method 400 may be carried out in any desired environment.

As shown, upon receiving control in operation 402, operations of method 400 proceed in the manner indicated. Such control may be received after a client application (e.g. see, for example, the client application 302 of FIG. 3, etc.) pushes any appropriate data to a stack (e.g. see, for example, the stack 318 of FIG. 3, etc.) in association with a routine call.

Upon receiving control, the method 400 may continue by receiving an indicator of the number of bytes to be read by a compiler (e.g. see, for example, the compiler 310 of FIG. 3, etc.). See operation 406. Thereafter, data in the form of arguments, etc. are read from the stack per operation 408, until the indicated number of bytes has been reached. Specifically, if and when the indicated number of bytes has been reached per decision 410, the compiler stops reading in operation 412.

Specifically, in one possible embodiment, the stack may be read entry-by-entry such that, after each read entry, a total tally of a number of bytes read thus far is updated and compared to the indicated number of bytes. This entry-by-entry reading may continue until the indicated number of bytes has been reached, after which the reading may be terminated. Of course, any other type of technique may be utilized for ensuring that the indicated amount of data is not exceeded.

Next, in operation 414, the called routine is executed utilizing the data read from the stack. Further, since only the appropriate amount of data has been read from the stack, the execution of unwanted code is avoided by preventing the reading of data beyond the indicated amount, which may potentially be deemed malicious.

For example, in the context of a C/C++ run-time library that provides routines like printf, scanf, etc., a hacker may craft input appropriately such that these routines are manipulated to access more data than the client application actually indicated for the routine to read. Specifically, in the context of the routine printf( ) the hacker may use a format string to tell the printf( ) routine to read more parameters than are actually supplied. Thus, the hacker may use the printf( ) routine for reading more data from the stack than was actually supplied, and to even dump the return address location of the stack. By knowing where such return address location is stored, the hacker may change the return address to execute unwanted code.

However, utilizing the foregoing techniques set forth in the previous figures in accordance with one optional embodiment, the hacker's attempt would be thwarted, since the additional data that the hacker desired to be read would indeed not be read in view of a limit on stack reading (e.g. see, for example, decision 410 of FIG. 4, etc.).

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    receiving an indicator representative of an amount of data to be read from a stack; and
    reading from the stack the amount of data based on the indicator, utilizing a processor;
    wherein execution of unwanted code is avoided;
    wherein the indicator is received in association with a routine called by a client application;
    wherein the indicator is conditionally received based on whether the routine includes at least one of a printf routine and a scanf routine.

2. The method of claim 1, wherein the indicator is representative of a number of bytes of data to be read from the stack.

3. The method of claim 1, wherein the indicator is conditionally received based on the routine.

4. The method of claim 1, wherein the indicator is conditionally received based on a vulnerability of the routine.

5. The method of claim 1, wherein the data read from the stack includes arguments associated with the routine.

6. The method of claim 1, wherein the reading is stopped upon reading from the stack the amount of data.

7. The method of claim 1, wherein the receiving is carried out utilizing a compiler.

8. The method of claim 7, wherein the indicator is received from a library.

9. The method of claim 8, wherein the library includes a run-time library.

10. The method of claim 1, wherein the execution of unwanted code is avoided by preventing the reading of data beyond the amount, which is at least potentially malicious.

11. A computer program product embodied on a computer readable medium, comprising:
    computer code for receiving an indicator representative of an amount of data to be read from a stack; and
    computer code for reading from the stack the amount of data based on the indicator;
    wherein the computer program product is operable such that execution of unwanted code is avoided;
    wherein the computer program product is operable such that the indicator is conditionally received based on whether a routine includes at least one of a printf routine and a scanf routine.

12. A system, comprising:
    a processor; and
    a compiler for utilizing an indicator representative of an amount of data to be read from a stack;
    wherein the system is operable such that the amount of data is read from the stack data based on the indicator so that execution of unwanted code is avoided;
    wherein the system is operable such that the indicator is received in association with a routine called by a client application;
    wherein the system is operable such that the indicator is conditionally received based on whether the routine includes at least one of a printf routine and a scanf routine.

13. The system of claim 12, wherein a library is in communication with the compiler.

14. The system of claim 13, wherein the client application is in communication with the compiler.

* * * * *